United States Patent [19]

Hanson et al.

[11] 4,358,246
[45] Nov. 9, 1982

[54] NOISE REDUCTION MEANS FOR PROP-FAN AND THE CONSTRUCTION THEREOF

[75] Inventors: Donald B. Hanson, Broad Brook; Frederick B. Metzger, Simsbury, both of Conn.

[73] Assignee: United Technologies Corporation, Hartford, Conn.

[21] Appl. No.: 232,599

[22] Filed: Oct. 13, 1981

Related U.S. Application Data

[62] Division of Ser. No. 58,046, Jul. 16, 1979.

[51] Int. Cl.$^3$ .............................................. B64C 11/18
[52] U.S. Cl. ................................. 416/223 R; 416/228; 416/DIG. 2; 415/119; 415/181
[58] Field of Search ................. 416/228, 238, DIG. 2, 416/223 R; 415/181, 119

[56] References Cited

U.S. PATENT DOCUMENTS

| | | | |
|---|---|---|---|
| 1,991,095 | 2/1935 | Hochstetter | 416/DIG. 2 |
| 2,269,287 | 1/1942 | Roberts | 416/238 |
| 3,972,646 | 8/1976 | Brown et al. | 416/228 |
| 3,989,406 | 11/1976 | Bliss | 415/181 X |
| 3,995,970 | 12/1976 | Nobuyuki et al. | 415/181 X |
| 4,012,172 | 3/1977 | Schwaar et al. | 416/228 |
| 4,168,939 | 9/1979 | Schmitz et al. | 416/228 A |
| 4,171,183 | 10/1979 | Cornell et al. | 416/223 R X |
| 4,248,572 | 2/1981 | Fradenburgh | 416/242 X |

FOREIGN PATENT DOCUMENTS

| | | | |
|---|---|---|---|
| 684161 | 6/1930 | France | 416/238 |
| 184376 | 8/1936 | Switzerland | 416/228 |

OTHER PUBLICATIONS

Mechanix Illustrated; Apr. 1978; vol. 74, No. 599, p. 38.
AIAA Paper No. 76-565, 3rd AIAA Aero-Acoustics Conference, Palo, Cal., Jul. 2-23, 1976.

Primary Examiner—Everette A. Powell, Jr.
Attorney, Agent, or Firm—Norman Friedland

[57] ABSTRACT

A prop-fan of the type having a high solidity factor (1 or greater) near the root fairing to a lower solidity factor (less than 1) near the tip and operable over a critical Mach No. range is designed for sound suppression by contouring the tip so that its sweep and sweep distribution of the leading and trailing edge bears a judicious relationship with the Mach surface. This feature is obtainable by designing the planform from a prescribed linearized or non-linearized acoustic theory and tailoring in the sweep so that the leading and trailing edges fall behind the Mach surface.

1 Claim, 4 Drawing Figures

NOISE REDUCTION MEANS FOR PROP-FAN AND THE CONSTRUCTION THEREOF

This is a division of application Ser. No. 58,046 filed on July 16, 1979.

BACKGROUND OF THE INVENTION

This invention relates to prop-fans and particularly to a low noise prop-fan and the method of designing a planform for achieving a low noise profile.

For purposes of this disclosure, a prop-fan is of the type being developed by the Hamilton Standard Division of United Technologies Corporation, the common assignee and which is described in American Institute of Aeronautics and Astronautics Paper No. 75-1208 presented at the Propulsion Conference held on Sept. 29–Oct. 1, 1975 at Annaheim, California incorporated herein by reference. For the sake of convenience and simplicity, the prop-fan, as considered herein, is a relatively small diameter, highly loaded multiple bladed (more than four blades) variable pitch propulsor having swept blades with thin airfoil section in the lower portion toward the root that has a solidity factor of 1.00 or greater and the airfoil section closer to the tip has a solidity factor of less than 1.00.

As is well known, there has been a recent concern of ecology and noise pollution and aircraft have been under attack for its noise contribution. Needless to say, a great effort has been and is currently in progress to reduce the noise level in the environment while concomitantly enhancing of the conservation of energy. Accordingly, this invention is directed to reducing the noise level of aircraft propulsors while improving or at least not impairing their fuel economy.

The prop-fan contemplated in this invention is a small diameter propeller, say, nearly half the diameter of the conventional propeller and having say from six to twelve blades. The rotational speed is such that the airfoils of the propeller blades are operating at or above a critical Mach No. and the tip may be operating at transonic and supersonic speeds.

Obviously, without any consideration to the noise level and based on current theory and state-of-the-art design, the noise propagated at this speed would realistically be considered unacceptable. Attempts have been made to design the sweep distribution utilizing aerodynamic theories developed for wings of aircraft in the belief that inasmuch as blades are airfoils, the same theory should be equally valid. Hence, with this in mind the first attempt to design the sweep of the blade was to utilize the wing theory—known as the cosine law for ascertaining the Mach surfaces.

Although this was considered by some skilled in the art to be a logical approach for designing the planform of the blade, it was soon discovered that blades made according to this theory did not produce the results contemplated.

Accordingly, and according to this invention, it was ascertained that in order to achieve a noise reduction, it was necessary to design the sweep distribution of the blades so that the leading and trailing edges fall behind the leading and trailing Mach surfaces, respectively. To achieve this end, the planform shape is first arrived at mathematically from well known linearized or non-linearized aeroacoustic theory as say from that theory prescribed in the AIAA Paper No. 76-565 presented at the Aero-Acoustics Conference held on July 20–23, 1976 at Palo Alto, California incorporated herein by reference. This establishes a trial planform from which the sweep can then be tailored by actual trial and error to meet the results desired. In actuality the sweep is increased to the point where satisfactory noise reduction is achieved.

SUMMARY OF THE INVENTION

A feature of this invention is to provide means for reducing the noise level of a prop-fan propulsor by designing the airfoil planform so that the leading and trailing edges fall behind the leading and trailing Mach surface and a procedure for achieving that end.

Other features and advantages will be apparent from the specification and claims and from the accompanying drawings which illustrate an embodiment of the invention.

DESCRIPTION OF THE PREFERRED EMBODIMENT

Figure 1:
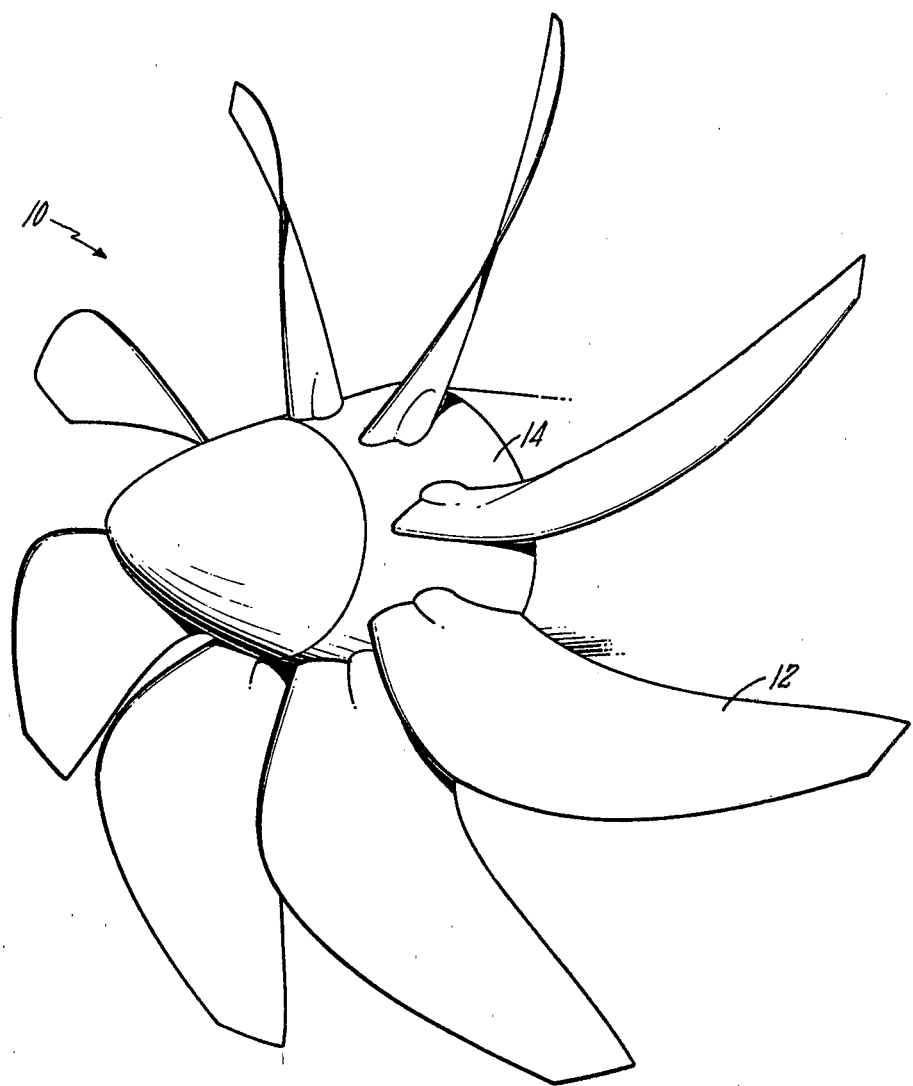
FIG. 1 is a perspective view of a prop-fan propulsor.

As can be seen in FIG. 1, the prop-fan generally illustrated by reference numeral 10 comprises a plurality of variable pitch blades 12 rotatably supported in a suitable hub 14 for conventional pitch change movements. As the invention is primarily concerned with the planform of the blades, the details of the blade rotating and pitch changing movement are omitted herein for the sake of convenience and simplicity. However, for details of a propeller, reference can be made to the various models of propellers, as the S4H60, 63E60, 24PF, etc., manufactured by Hamilton Standard Division of United Technologies Corporation.

Unlike conventional propellers, the prop-fan blade tips move relative to the air at transonic and supersonic speeds. Consequently, the pressure waves around the blades become sufficiently strong to manifest into shock waves. These, in turn, propagate away from the prop-fan and are observed as noise signals. If one were to apply Fourier analysis of these waves, it will be discovered that these shock waves contain high levels of high frequency noise which is objectionable for blades operating at transonic and supersonic helical Mach numbers.

The next portion of this disclosure will describe the procedure for obtaining the requisite planform to meet the noise criteria desired. Obviously, the objectives are to design the propulsor so that it not only is efficient from a fuel economy standpoint, and has the necessary structural integrity, it must meet Federal noise regulations and it should be as noise free as possible.

Figure 2:
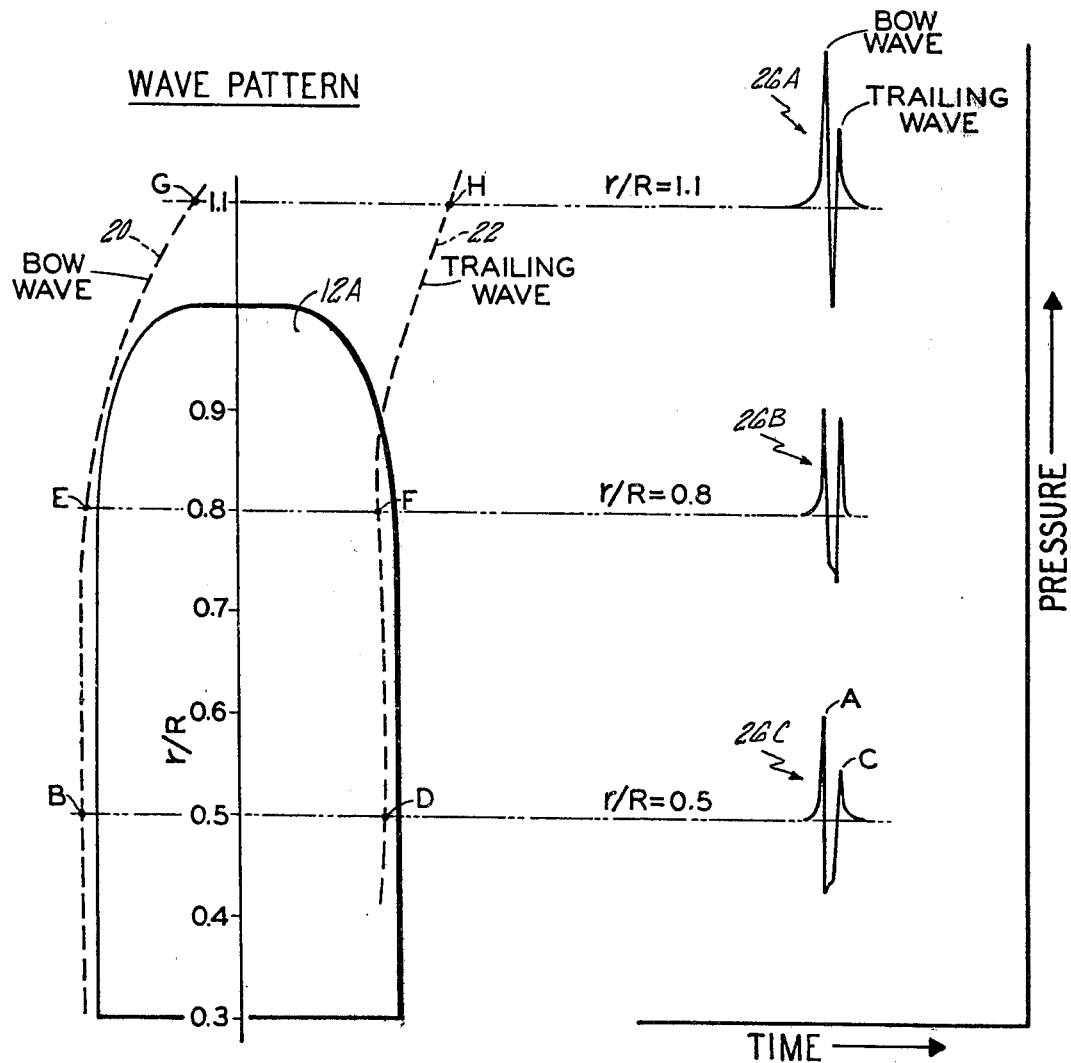
FIG. 2 is a graphic view of the blade with an unswept planform and the waveforms used to chart the Mach surfaces with a plot of the calculated leading and trailing Mach surfaces.

As noted above, the planform shape is arrived at mathematically from linearized aeroacoustic theory, and in this particular embodiment, from theory described in the AIAA Paper No. 76-565, supra. FIG. 2 shows an example of calculated leading and trailing Mach surfaces or bow wave and trailing wave respectively, (illustrated by the curved lines 20 & 22 respectively) generated by blade 12a (corresponding to blade 12 of FIG. 1) with an unswept planform. The leading Mach surface 20 was constructed by calculating noise pressure waveforms illustrated by reference numerals 26A, 26B and 26C at several radial stations (1.1, 0.8 and 0.5) and then connecting the points locating the leading edge pressure pulses.

This is done by indexing the waveforms to the particular stations on the blade at a given time and plotting the points. As for example, the peak A of waveform 26C at the 0.5 station reflects the wave pattern at the leading edge plotted as point B (r/R is the nondimensional radii terms where r is the actual radius and R is the total radius). The peak C reflects the wave pattern at the trailing edge and corresponds to plotted point D. Similarly the other points (E, F, G and H) are plotted for waveforms 26B and 26A. (Obviously as many points can be plotted as may be desired.) The points are connected to produce the Mach surfaces 20 and 22, as shown. This planform is an actual test model blade that has the calculated waveforms as shown, noting that the positive peaks are spiked which is, as is well known, a noise signal.

Figure 3:
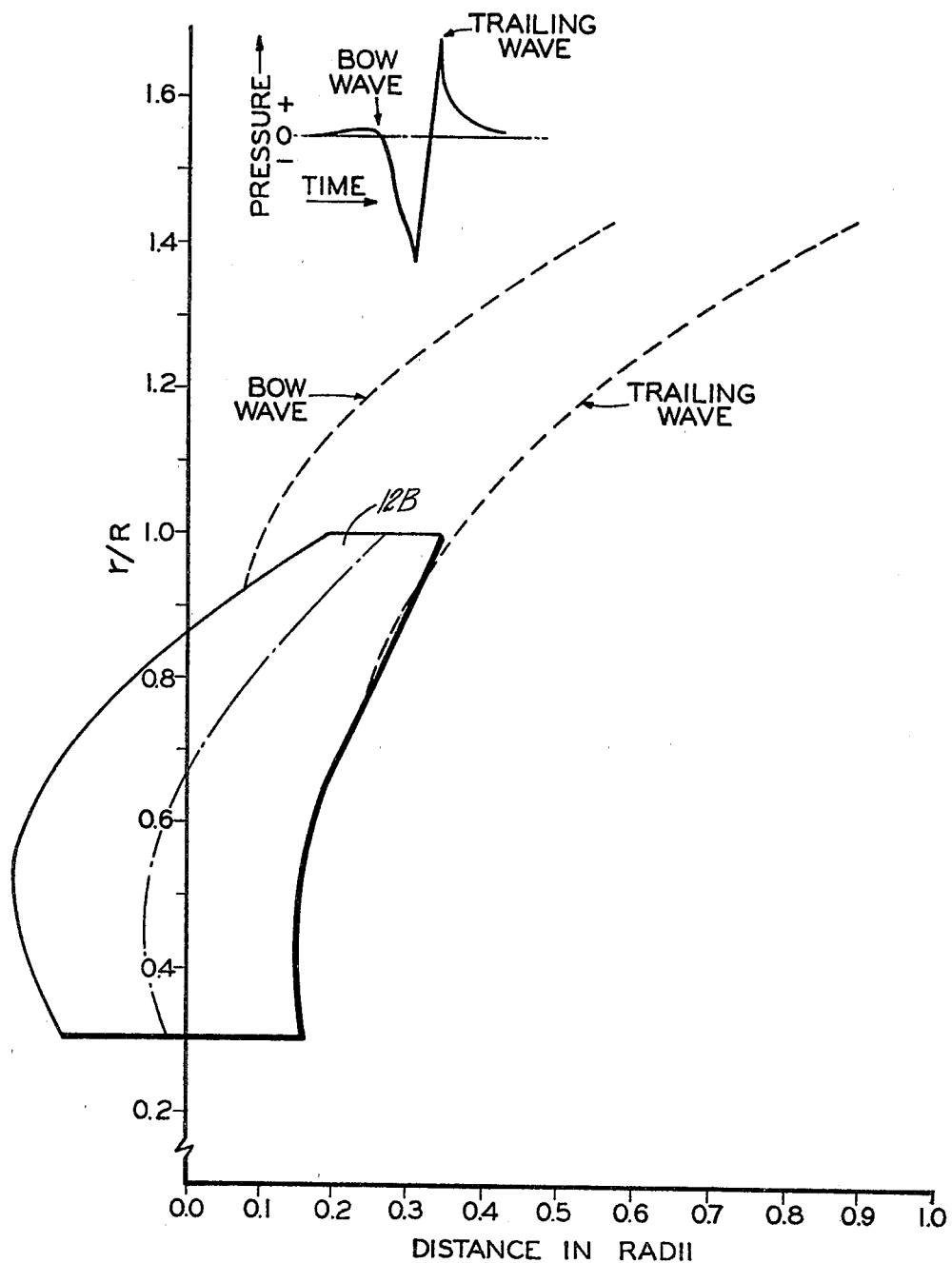
FIG. 3 is similar to FIG. 2 with additional sweep showing an intermediate step to achieve the desired planform.
Figure 4:
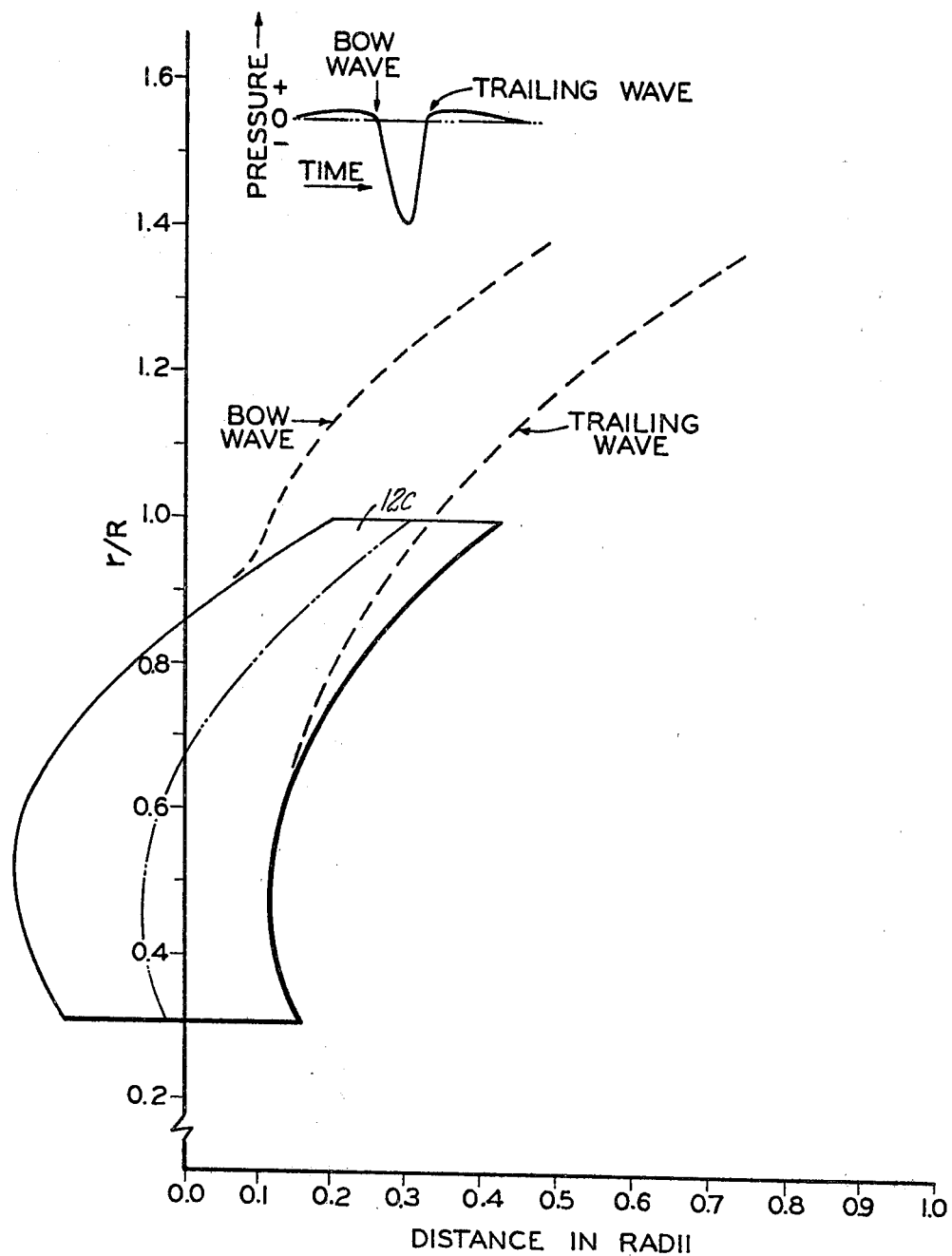
FIG. 4 is similar to FIGS. 2 and 3 with still additional sweep showing the desired planform.

The strong positive pressure peaks occur because the blade edges are more or less aligned with the Mach surfaces. This can be improved upon by sweeping the planform edges behind their corresponding Mach surfaces as shown in FIGS. 3 and 4. As can be seen in FIG. 3, blade 12B shows a planform with enough sweep to move the leading edge 30 behind its Mach surface 32. As can be seen in the noise waveform, the leading positive pulse is eliminated reflecting a consequential reduction in noise. FIG. 4 shows a more extreme sweep of blade 12C where both blade edges fall behind their corresponding Mach surfaces. The reduction in leading and trailing edge pulse in the noise waveform and the significant smoothing out of the positive spikes as shown in FIG. 4 indicates the reduction in the noise generated by the prop-fan blades. Since the Mach surface locations change when the planform is changed, the noise reduction planform of this invention is the result of a trail and error process accomplished by use of the theory described in AIAA Paper No. 76-565 or by actual pressure wave measurements.

It should be understood that the invention is not limited to the particular embodiments shown and described herein, but that various changes and modifications may be made without departing from the spirit and scope of this novel concept as defined by the following claims.

We claim:

1. The method of designing the planform of a prop-fan blade whose airfoil section operates at or above a critical Mach No. for reducing its noise level comprising the steps of calculating the planform to obtain the sweep distribution of the blade for obtaining performance and noise level design objectives, calculating the Mach surfaces of the leading and trailing edges of the blade in accordance with linearized or non-linearized aeroacoustical theory, sweeping the tip to an intermediate radial blade station so that the blade sweep distribution is such that the leading and trailing edges fall behind the desired leading and trailing Mach surfaces respectively, repeating the step of calculating the Mach surfaces to ascertain whether or not the leading and trailing edges actually fall behind its leading and trailing Mach surface, and repeating the last two mentioned steps until such time as the leading edge falls behind the leading Mach surface and the trailing edge falls behind the trailing Mach surface.

* * * * *